Sept. 27, 1960 P. BURSTOW ET AL 2,954,508
ELECTRONIC SELECTING DEVICE
Filed Nov. 20, 1957
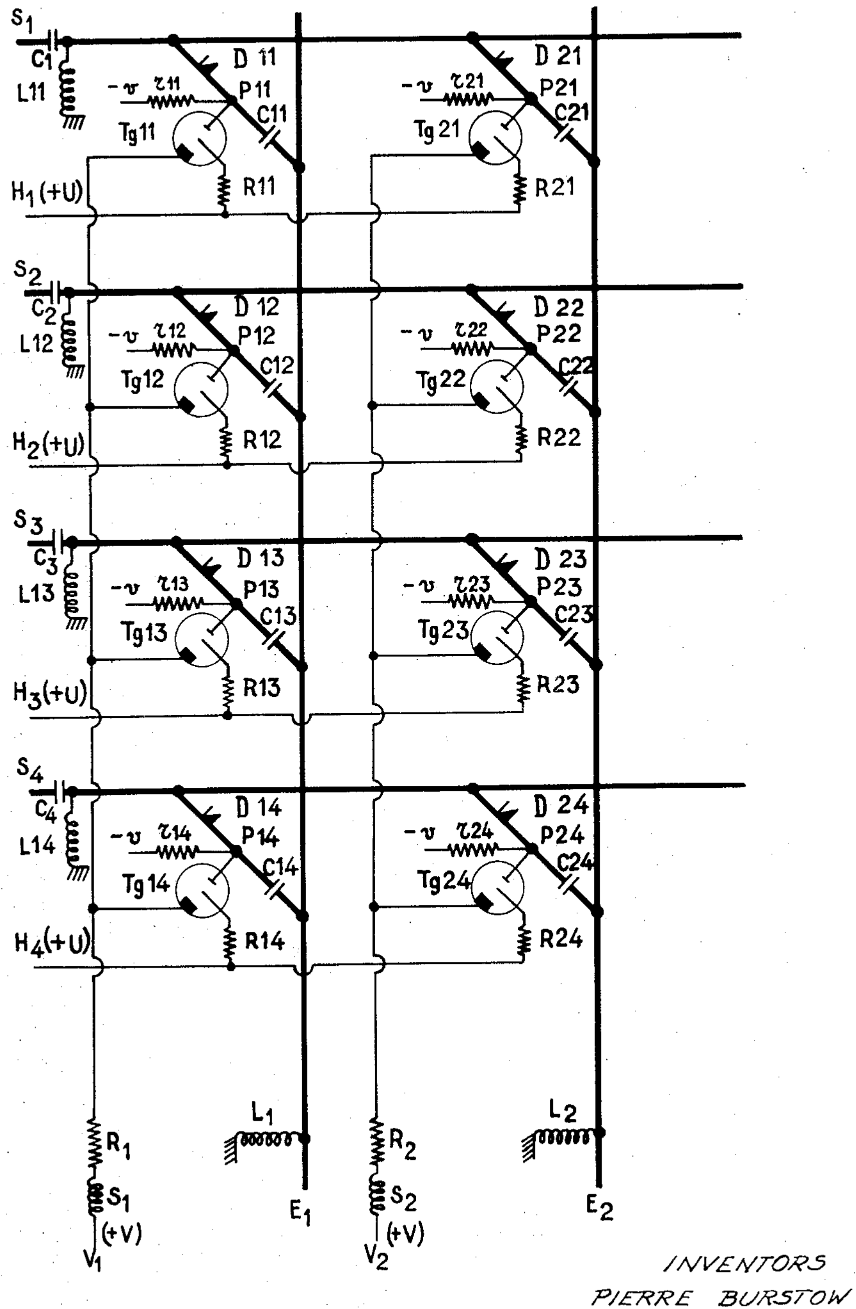
INVENTORS
PIERRE BURSTOW
CLAUDE MONIN
BY Paul M. Craig Jr
ATTORNEY United States Patent Office 2,954,508

Patented Sept. 27, 1960

2,954,508

ELECTRONIC SELECTING DEVICE

Pierre Burstow, Paris, and Claude Monin, Villennes-sur-Seine, France, assignors to Compagnie Industrielle des Telephones, Paris, France, a corporation of France Filed Nov. 20, 1957, Ser. No. 697,693

Claims priority, application France Nov. 23, 1956

6 Claims. (Cl. 315—166)

The present invention relates to electronic selecting devices. It is already known to employ gas filled diodes in such devices, but such diodes do not permit simple control of the switching stages.

A main object of the present invention is to provide an electronic selecting device which does permit simple control of the switching stages, and accordingly the invention provides an electronic selecting device for establishing a connection for the passage of alternating current between selected input and output circuits, wherein each input circuit is associated with each output circuit by a separate switching element comprising two decoupling condensers and an interposed rectifier series connected between associated input and output circuits, a gas tube with an auxiliary electrode and having the cathode connected intermediate the input condenser and rectifier and an inductance connected intermediate the second condenser and rectifier, and wherein the anodes of tubes associated with any one input circuit are connected to a common source of direct voltage through a load, and the auxiliary electrodes of tubes associated with any one output circuit are connected to a further common source of direct voltage, the arrangement of the components being such that the flow of direct current which takes place when a selected tube is struck passes through the rectifier and inductance and enables alternating current to flow between associated input and output circuits.

In order that the invention may be more clearly understood and readily carried into effect, one embodiment thereof will now be described with reference to the accompanying drawing, which shows by way of example a part of the circuit of an electronic selecting device embodying the invention.

The illustrated device comprises selecting elements disposed in vertical and horizontal rows. The figure illustrates two columns of elements each comprising four elements. The inputs of the four elements in a column are connected in parallel, and the outputs of the two elements in a horizontal row are similarly connected in parallel. Situated between each input $E_1$ or $E_2$ and each output $S_1$, $S_2$, $S_3$ or $S_4$ is a selecting element 11 to 14, or 21 to 24. Each selecting element, such as 22, comprises a rectifier $D_{22}$ and a condenser $C_{22}$, connected in series between the input $E_2$ and the output $S_2$, and a gas tube $Tg_{22}$, the cathode of which is connected to a point $P_{22}$ situated between the rectifier $D_{22}$ and the condenser $C_{22}$. A source of negative E.M.F. $-v$ is also connected to the point $P_{22}$ through a resistance $r_{22}$. The tube comprises an anode which is connected in parallel with the anodes of all the tubes of a common vertical column, and an auxiliary electrode, which is connected in parallel with the auxiliary electrodes of the tubes of a common horizontal row via a resistance $R_{22}$. The auxiliary electrodes of a common horizontal row are connected to a common voltage source $+U$ which constitutes a horizontal control $H_2$.

The anodes of the tubes of a common vertical column are connected to a common source such as $V_2$ (of voltage $+V$) across a common ballast resistance $R_2$ and an inductance $S_2$.

The selecting device comprises, in addition, input decoupling devices $L_1$ or $L_2$ and output decoupling devices $C_1$ $L_{11}$ to $C_4$ $L_{14}$.

The auxiliary electrodes of the tubes of a common horizontal row are controlled by controls $H_1$, $H_2$, $H_3$ or $H_4$ which constitute horizontal controls of the selecting device. The anodes of the tubes of a common vertical column are controlled by controls $V_1$ or $V_2$ which constitute vertical controls of the selecting device. The points $P_{11}$ to $P_{24}$ are biased, by a negative voltage $-v$ so as to render the associated rectifier non-conductive in the direction E to S when the associated gas tube has not been struck.

When a gas tube, for example $Tg_{22}$, is struck, the direct-current which it supplies flows through the rectifier $D_{22}$ and through the inductance $L_{12}$. The direct-current supplied to the tube flows through the resistance $R_2$ of the vertical control $V_2$, and hence causes a voltage drop across $R_2$ such that the other gas tubes of the same column cannot strike.

The operation of the device just described is as follows: When no voltage is applied to the vertical and horizontal controls, none of the gas tubes can strike, and hence no switching element is conductive.

If, under these conditions, the necessary voltages $+U$ and $+V$ are applied to the horizontal control $H_2$ and to the vertical controls $V_2$, the tube $Tg_{22}$ strikes and supplies a direct current which, on the one hand, renders the rectifier $D_{22}$ conductive, and on the other hand, causes the voltage $+V$ across the terminals of $R_2$ to drop to a value lower than the striking voltage for the tubes. The connection $E_2$—$S_2$ which has been established, is still maintained if the voltage $+U$ of the horizontal control $H_2$ is suppressed, and further, this connection cannot embrace the anode circuit of the tube $Tg_{22}$ by reason of the high value of the resistance $R_2$. To break the connection $E_2$—$S_2$, the voltage of the control $V_2$ is suppressed.

If the necessary voltages $+U$ and $+V$ are now applied to the horizontal control $H_3$ and to the vertical control $V_1$, the tube $Tg_{23}$ cannot strike because, as a result of the firing of the tube $Tg_{22}$, the voltage $+V$ of the vertical control $V_2$ has fallen to a value insufficient to produce striking. Similarly, the tube $Tg_{12}$ cannot fire because the voltage $+U$ on the horizontal control $H_2$ has been suppressed. Only the tube $Tg_{13}$ will strike and, in accordance with the above described mechanism, prevent striking of any other tube situated in the same column. The connection $E_1$—$S_3$ is thus established and is maintained after the suppression of the voltage $+U$ and the horizontal control $H_3$.

We claim:

1. An electronic selection device for automatic switching, comprising a plurality of input lines and a plurality of output lines, a plurality of connection means for completing and interrupting a path for alternating current between any input line and any output line, each connection means comprising a rectifier, de-coupling condensers located at opposite ends of the connection means, and a gas tube comprising an anode, a cathode and an auxiliary electrode, a control circuit connected to said auxiliary electrode, a second control circuit connected to said anode, a load common to each of a plurality of connection means which may complete different paths to one of said lines, the gas tube and rectifier of each connecting means being connected in a series direct current circuit and the series direct current circuits of said plurality of connection means being connected in parallel with each other and in series with said load for energization from said second control circuit, each said connection means including inductive means for blocking alternating current in said path from a respective direct current source, said rectifier and tube being so connected in each said connection means that, when the tube is energized, the direct current therethrough passes through the rectifier and said alternating current may pass through the two condensers and through said rectifier superimposed on said direct current between respective input and output lines.

2. An electronic selection device according to claim 1, wherein each of said connecting means is provided with means including a voltage source for biasing said rectifier against conduction.

3. An electronic selection device more particularly for automatic switching, comprising circuits arranged in horizontal lines and vertical lines, connection means for completing and interrupting an alternating current between any horizontal line and any vertical line, each connection means comprising a rectifier, de-coupling condensers located at opposite ends of the connection means, and a gas tube comprising an anode, a cathode and an auxiliary electrode, the cathode being connected to a point located between said rectifier and one of the decoupling condensers, control circuits for said auxiliary electrodes, a control circuit for each of said vertical lines, each said last-mentioned control circuit comprising a source of current common to the anodes of the tubes of a plurality of said connection means along said vertical line and connected to said plurality of connection means through a common load, and an inductance being connected to a point located between the connection means rectifier and the other de-coupling condenser, the direction of the connection means rectifier being such that, when a tube is energized the direct current therethrough passes through the respective rectifier and the inductance and the passage of alternating current is permitted through the two condensers and the connection means rectifier.

4. A device according to claim 3 in which the load common to the tubes of which the anodes are fed by the same source comprises an inductance and a resistance.

5. A device according to claim 4 in which the control circuits of the auxiliary electrode of the tubes located on a same horizontal line are connected to be fed in parallel by a common source.

6. The method of selecting a path for the conduction of alternating current between an input and an output line in the apparatus according to claim 1, comprising the steps of connecting a direct current source to energize the anode of each of the tubes of the connecting means along said input line and simultaneously energizing each of the auxiliary electrodes of the tubes of the connecting means along said output line to fire the gas tube of the connecting means common to said input and said output lines and subsequently de-energizing the auxiliary electrodes along said line.

References Cited in the file of this patent

UNITED STATES PATENTS

| | | |
|---|---|---|
| 2,136,441 | Karolus | Nov. 15, 1938 |
| 2,426,278 | Mumma | Aug. 26, 1947 |
| 2,814,762 | Jackson | Nov. 26, 1957 |
| 2,818,531 | Peek | Dec. 31, 1957 |
| 2,866,132 | Beesley | Dec. 23, 1958 |